(12) United States Patent
Kim et al.

(10) Patent No.: US 11,231,618 B2
(45) Date of Patent: Jan. 25, 2022

(54) BACKLIGHT UNIT AND DISPLAY DEVICE INCLUDING THE SAME

(71) Applicant: LG Display Co., Ltd., Seoul (KR)

(72) Inventors: DongHwi Kim, Gyeonggi-do (KR); MyungWon Seo, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/934,561

(22) Filed: Jul. 21, 2020

(65) Prior Publication Data
US 2021/0026203 A1 Jan. 28, 2021

(30) Foreign Application Priority Data
Jul. 23, 2019 (KR) .................... 10-2019-0088913

(51) Int. Cl.
  G02F 1/13357 (2006.01)
  G02F 1/1339 (2006.01)
  G02F 1/1335 (2006.01)

(52) U.S. Cl.
  CPC ...... *G02F 1/133606* (2013.01); *G02F 1/1339* (2013.01); *G02F 1/133514* (2013.01); *G02F 1/133603* (2013.01)

(58) Field of Classification Search
None
See application file for complete search history.

(56) References Cited

U.S. PATENT DOCUMENTS

| 2016/0161661 A1* | 6/2016 | Cho ............. G02B 6/0043 362/606 |
| 2016/0363272 A1* | 12/2016 | Chang .......... G02F 1/133609 |
| 2019/0129249 A1* | 5/2019 | Lee ............. G02B 5/021 |
| 2019/0278134 A1* | 9/2019 | Okamoto ....... G02B 6/0055 |

FOREIGN PATENT DOCUMENTS

| JP | 2007-207572 A | 8/2007 |
| JP | 2008-286955 A | 11/2008 |
| JP | 2009-94087 A | 4/2009 |
| JP | 2009-229877 A | 10/2009 |
| JP | 2015-967 A | 1/2015 |
| JP | 2018-45972 A | 3/2018 |
| JP | 2018-98088 A | 6/2018 |
| JP | 2019-121547 A | 7/2019 |
| WO | WO 2011/024498 A1 | 3/2011 |

* cited by examiner

*Primary Examiner* — Elmito Breval
(74) *Attorney, Agent, or Firm* — Birch, Stewart, Kolasch & Birch, LLP

(57) ABSTRACT

Embodiments of the present disclosure provide a backlight unit comprising a light emitting unit including a plurality of light emitting devices, a light conversion sheet disposed on the light emitting unit and including a plurality of light conversion patterns overlapping with the plurality of light emitting devices, and a phosphor layer disposed in a rim portion of the light conversion sheet and including a phosphor film disposed on the light conversion sheet. A display device including the backlight unit is also provided.

20 Claims, 17 Drawing Sheets

BACKLIGHT UNIT AND DISPLAY DEVICE INCLUDING THE SAME

CROSS REFERENCE TO RELATED APPLICATION

This application claims priority to Korean Patent Application No. 10-2019-0088913, filed in the Republic of Korea on Jul. 23, 2019, the entire contents of which are hereby expressly incorporated by reference for all purposes as if fully set forth herein into the present application.

BACKGROUND

Field

Embodiments of the present disclosure relate to a backlight unit and a display device including the same.

Description of Related Art

Along with the development of the information society, the demand for display devices for displaying images is more and more increasing in a variety of application fields. For a display device, various display devices such as, e.g., liquid crystal displays (LCDs), organic light emitting displays (OLEDs), quantum dot light emitting displays (QLEDs), and so on are recently being utilized.

A liquid crystal display device of various flat-panel display devices typically utilizes a Light Emitting Diode (LED), a Cold Cathode Fluorescent Lamp (CCFL), a Hot Cathode Fluorescent Lamp (HCFL) and the like, as a light source for a backlight unit. In recent years, the light-emitting diodes having excellent light efficiency and better color reproducibility are in wide use as a light source for the backlight unit of a display device.

The backlight units can be classified into an edge-type, a direct-type and so on according to the arrangement of the light sources and the transmission mode of light. In the direct-type of backlight unit, among others, the light source such as, e.g., an LED can be arranged on the back side of the display device.

BRIEF SUMMARY

Embodiments of the present disclosure provide a backlight unit capable of improving its image quality, and a display device using the same.

Further, embodiments of the present disclosure provide a backlight unit capable of reducing its manufacturing costs, and a display device using the same.

According to an aspect of the present disclosure, provided is a backlight unit comprising a light emitting unit including a plurality of light emitting devices, a light conversion sheet disposed on the light emitting unit and including a plurality of light conversion patterns, and a phosphor layer disposed in a rim portion of the light conversion sheet and including a phosphor film disposed on the light conversion sheet.

According to another aspect of the present disclosure, provided is a display device comprising a display panel and a backlight unit irradiating light onto the display panel, said backlight unit comprising a light emitting unit including a plurality of light emitting devices, a light conversion sheet disposed on the light emitting unit and including a plurality of light conversion patterns, and a phosphor layer disposed in a rim portion of the light conversion sheet and including a phosphor film disposed on the light conversion sheet.

According to the embodiments of the present disclosure, it is possible to provide a backlight unit capable of improving its image quality, and a display device using the same.

According to the embodiments of the present disclosure, it is possible to provide a backlight unit capable of reducing its manufacturing costs, and a display device using the same.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
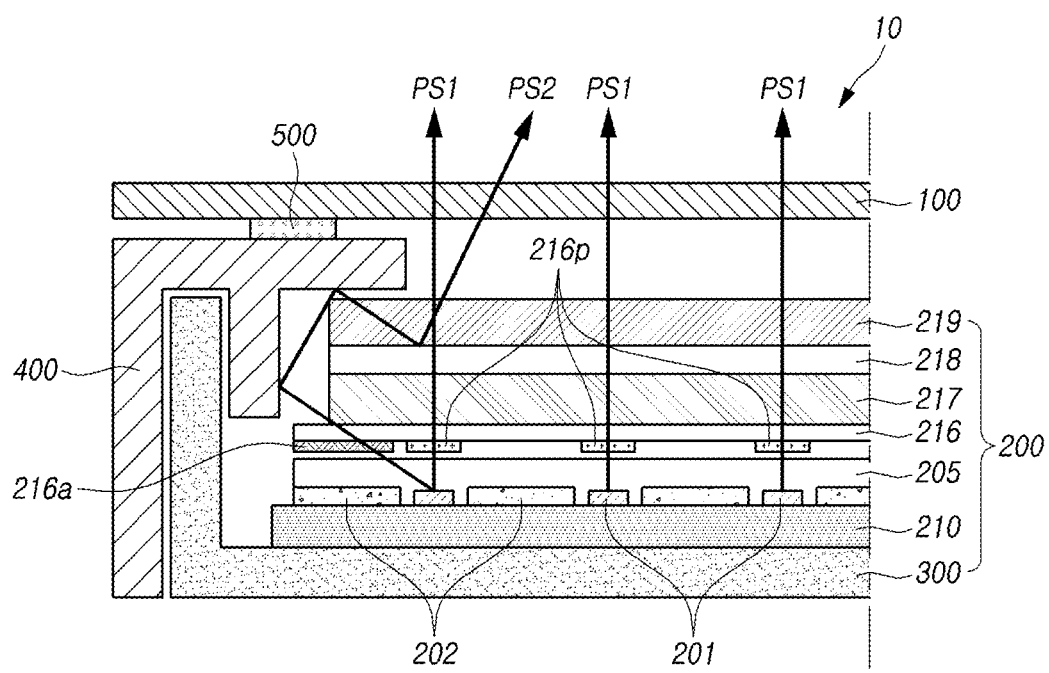
FIG. 1 is a cross-sectional view illustrating a display device according to one or more embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Figure 2:
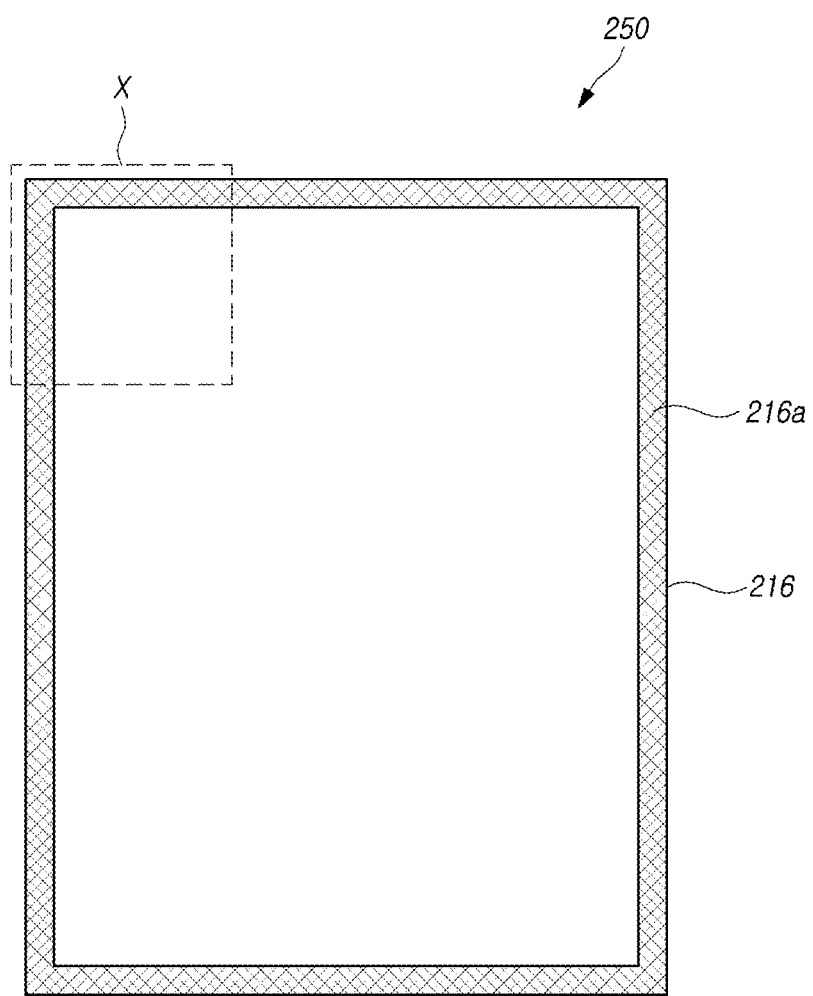
FIG. 2 is a plan view showing a light emitting unit according to one or more embodiments of the present disclosure.

FIG. 1 is a cross-sectional view showing a display device according to embodiments of the present disclosure, and FIG. 2 is a plan view showing a light emitting unit according to embodiments of the present disclosure. All the components of the display device and the light emitting unit according to all embodiments of the present disclosure are operatively coupled and configured.

Referring to FIGS. 1 and 2, a display device 10 can include a display panel 100 and a backlight unit 200.

The display panel 100 is configured to display images. In case the display panel 100 is made of a liquid crystal panel, it can include a liquid crystal and a color filter.

The backlight unit 200 is configured to irradiate light onto the display panel 100. The backlight unit 200 can include a light emitting unit 250 including a plurality of light emitting devices 201, a light conversion sheet 216 disposed on the light emitting unit 250 and including a plurality of light conversion patterns 216p, and a phosphor film 218 disposed on the light conversion sheet 216. Further, the backlight unit 200 can include a phosphor layer 216a disposed in a position corresponding to a rim of the light emitting unit 250.

The light emitting unit 250 can include a plurality of light emitting devices 201 disposed on a substrate 210, and can be configured to irradiate light emitted from the light emitting devices 201 onto the display panel 100. The light emitting device 201 can emit blue light, although it is not limited thereto.

The light emitting device 201 can include at least one light emitting diode (LED). The light emitting device 201 can include a small-sized mini light emitting diode (Mini LED) or a very small-sized micro light emitting diode (μLED). In addition, the light emitting device 201 can be disposed in a form of being mounted on the substrate 210 in a chip-shaped flip-chip structure, so that the thickness of the backlight unit 200 can be reduced, thereby providing a light source with a wide irradiation angle and high light efficiency.

Further, the light emitting unit 250 can include at least one reflector 202 disposed between the plurality of light emitting devices 201 on the substrate 210. The substrate 210 on which the light emitting devices 201 and the reflectors 202 are disposed can be a printed circuit board. The reflector 202 can be fixed onto the substrate 210 by means of an adhesive tape. When the light emitting device 201 is disposed in a chip shaped structure, the light emitting device 201 can be implemented in a relatively small size, so the height of the reflector 202 can be higher than the height of the light emitting device 201.

Then, the light emitting unit 250 can include a resin layer 205 disposed on the plurality of light emitting devices 201 and the reflectors 202. The resin layer 205 can serve to protect the plurality of light emitting devices 201 disposed on the substrate 210 and can cause diffusion of the light emitted from the light emitting devices 201 to provide a function of a light guide plate. Thus, the light emitted from the light emitting device 201 can spread out as evenly as possible passing through the upper surface of the resin layer 205.

Further, the backlight unit 200 can include a light conversion sheet 216 which can be disposed on the light emitting unit 250. Alternatively, the light conversion sheet 216 can be disposed on the resin layer 205. The light conversion sheet 216 can cause scattering, reflection, or diffraction of part of the light irradiated from the light emitting device 201. Further, the light conversion sheet 216 can cause to undergo transmission of part of the light irradiated from the light emitting device 201. The light conversion sheet 216 can be a light control sheet that can transmit part of the irradiated light. The light conversion sheet 216 can include a plurality of light conversion patterns 216p, and the plurality of light conversion patterns 216p can be disposed to overlap each of the plurality of light emitting devices 201.

The light conversion pattern 216p can be configured to cause scattering, reflection, and/or diffraction of part of the light irradiated from each light emitting device 201. Further, the light conversion pattern 216p can be configured to transmit part of the light emitted from the light emitting device 201. The light conversion pattern 216p can be a light control pattern capable of transmitting part of the incident light. By arranging the light conversion pattern 216p in an area having the strongest intensity of the light emitted from the light emitting device 201, it is possible to reduce occurrence of luminance deviation between the area in which the light emitting device 201 is disposed (i.e., the area having a relatively larger amount of light) and the area between the light emitting devices 201 (i.e. the area having a relatively smaller amount of light). Further, the light conversion sheet 216 can include a light conversion material, and the light conversion pattern 216p of the light conversion sheet 216 can include such a light conversion material as well. Further, the light conversion material can include titanium dioxide ($TiO_2$). In addition, the light conversion material can be of white color, although it is not limited thereto.

Thus, the light conversion sheet 216 can suppress occurrence of a smear defect (also known as "mura" in Japanese) from the backlight unit 200, by causing part of the light irradiated from the light emitting device 201 to be scattered, reflected, diffracted, and/or transmitted. Hence, the luminance of light irradiated from the backlight unit 200 can become more uniform.

Further, the backlight unit 200 can include a diffuser plate 217 disposed on the light conversion sheet 216. Further, the backlight unit 200 can include a phosphor film 218 disposed on the diffuser plate 217.

The diffuser plate 217 can be adapted to diffuse incident light emitted from the light emitting device 201. The phosphor film 218 can be adapted to receive the light emitted from the light emitting device 201 to allow white light to be out. The phosphor film 218 can include a phosphor material that is adapted to absorb blue light to emit white light. When the phosphor emitting green light and the phosphor emitting red light are mixed together, the mixed phosphor can be caused to absorb blue light to emit white light. The phosphor material can be yttrium-aluminum garnet (YAG)-based, lutetium-aluminum garnet (LuAG)-based, or SiON-based phosphor, or a quantum dot (QD) phosphor containing quantum dots, although not limited thereto. In addition, the backlight unit 200 can include an optical sheet 219 disposed on the phosphor film 218. The optical sheet 219 can cause collection or diffusion of the light to be transmitted to the display panel 100. The optical sheet 219 can include a light collection sheet and a light diffusion sheet.

Further, the backlight unit 200 can include a cover bottom 300 that is configured to accommodate optical elements constituting the backlight unit 200. The substrate 210 can be disposed on the cover bottom 300. The cover bottom 300 can serve to protect a back surface of the substrate 210 and radiate heat generated from the light emitting devices 201.

Further, the backlight unit 200 can include various structures disposed between the backlight unit 200 and the display panel 100, such as, for example, a guide panel 400 and a foam pad 500. The guide panel 400 can be disposed on one side surface of the light emitting unit 250. The display panel 100 can be fixed onto the backlight unit 200 by the guide panel 400 and the foam pad 500.

The phosphor film 218 disposed over the light conversion sheet 216 can cause excitation of the light emitted from the light emitting unit 250 to emit white light. Most of the light emitted from the light emitting unit 250 is excited through the phosphor film 218 to become white light, and then irradiated to the display panel 100. However, some of the light emitted from the light emitting unit 250 can be emitted from the side of the light emitting unit 250, and this light emitted from the side of the light emitting unit 250 can be blue light because it does not pass through the phosphor film 218.

In more detail, the light emitted from the light emitting unit 250 can include a first path PS1 of light travelling vertically in the direction of the display panel 100 and a second path of PS2 light travelling in the lateral direction of the light emitting unit 250, although the paths of light emitted from the light emitting unit 250 are not limited thereto. The light traveling through the first path PS1 can be transmitted to the phosphor film 218 disposed above, wherein the phosphor film 218 can be adapted to cause excitation of the light in the first path PS1 to output white light. However, the light traveling in the second path PS2 can be reflected by the guide panel 400, and the reflected light can be again reflected off an upper surface of the phosphor film 218 to be then irradiated onto the display panel 100. Since the light traveling in the second path PS2 does not pass through the phosphor film 218, the light traveling in the second path PS2 is adapted to maintain the color of light initially emitted from the light emitting device 201. Then, the light traveling in the second path PS2 is allowed to be more concentrated on a rim portion of the light emitting unit 250.

When blue light is emitted from the light emitting device 201, a blue light component can be displayed in a large amount at the rim portion of the light emitting unit 250. Then, when the blue light component is strong, so-called mura displayed in a blue band can appear in the light emitting unit 250. Blue color can be typically perceived as dark visually, and thus, there often arise a problem that the luminance uniformity of light emitted from the light emitting unit 250 can deteriorate.

In order to solve the above problem, the backlight unit 200 can be arranged with a phosphor layer 216a on the light conversion sheet 216 disposed at a position where the light in the second path PS2 passes. The position through which the light travelling in the second path PS2 passes can correspond to the rim portion of the light emitting unit 250. Therefore, as illustrated in FIG. 2, the phosphor layer 216a can be disposed along the position corresponding to the rim portion of the light emitting unit 250 in the light conversion sheet 216.

Further, the light traveling through the second path PS2 can be excited by the phosphor layer 216a to be output as white light. The phosphor layer 216a makes it possible to greatly reduce the size of the blue light component at the rim portion of the light emitting unit 250, thereby suppressing the occurrence of mura in the light emitting unit 250.

Figure 3:
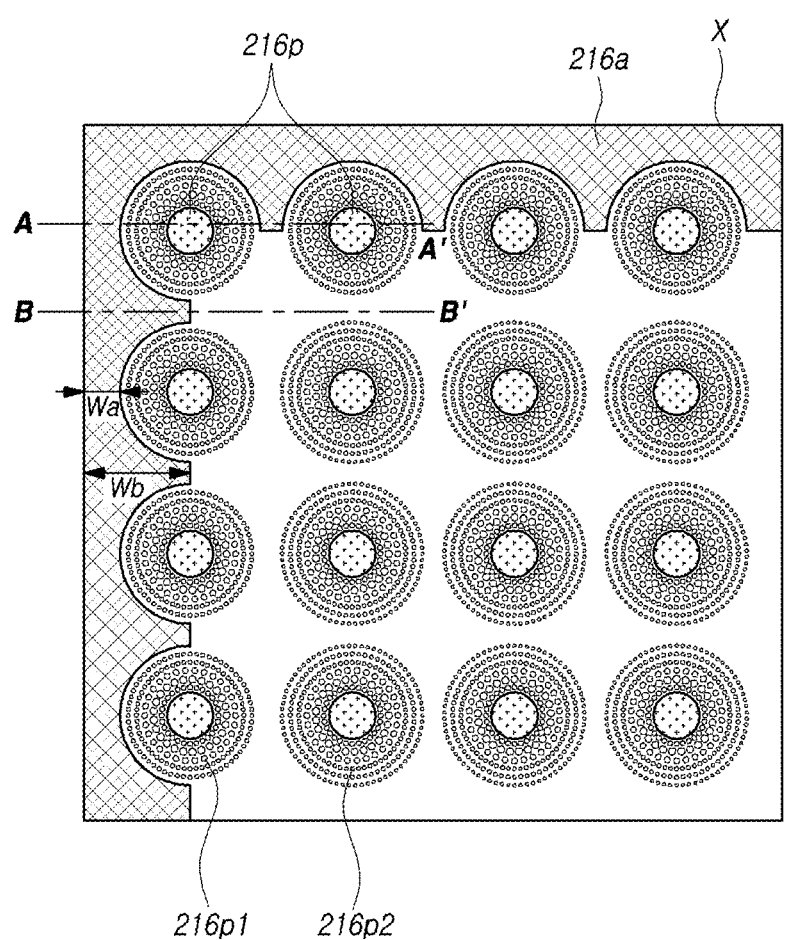
FIG. 3 is a plan view showing a light conversion sheet disposed in a portion X of FIG. 2 in one or more embodiments of the present disclosure.
Figure 4:
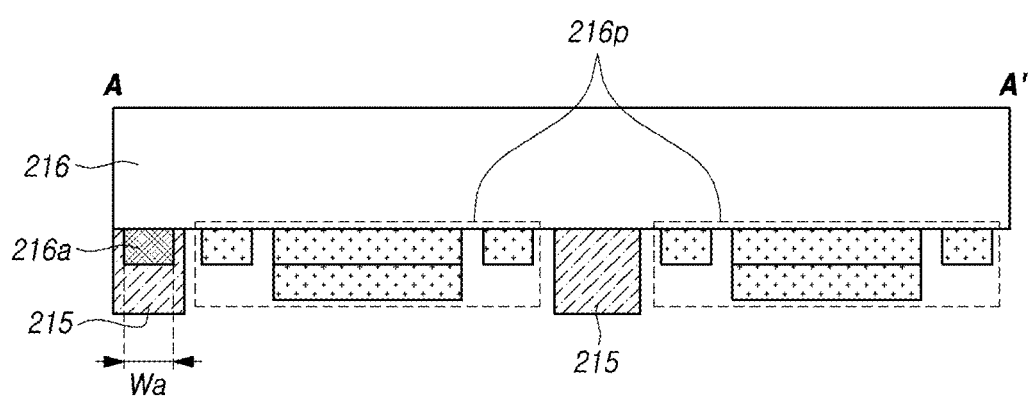
FIG. 4 is a cross-sectional view showing a cross-section along a line A-A' in FIG. 3.
Figure 5:
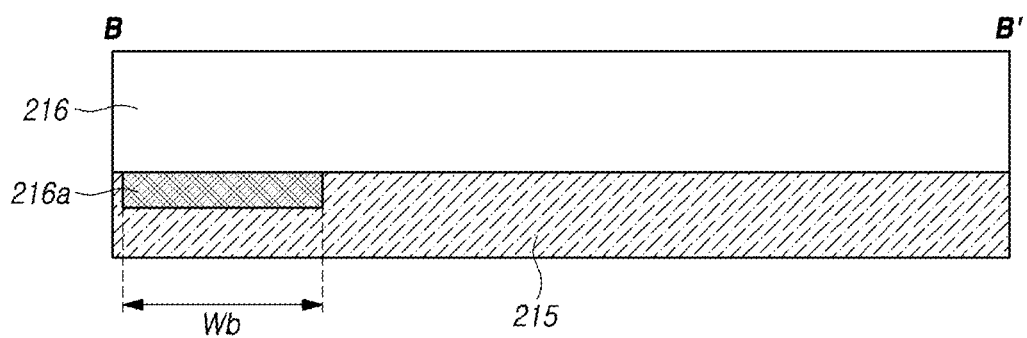
FIG. 5 is a cross-sectional view showing a cross-section along a line B-B' in FIG. 3.

FIG. 3 shows a plan view of a light conversion sheet disposed in a portion X of FIG. 2 in one or more embodiments of the present disclosure, FIG. 4 shows a cross-sectional view of a cross-section along a line A-A' in FIG. 3, and FIG. 5 shows a cross-sectional view of a cross-section along a line B-B' in FIG. 3.

Explaining now with reference to FIGS. 3 to 5, the light conversion sheet 216 can include a plurality of light conversion patterns 216p. Further, the phosphor layer 216a can be disposed between one end of the light conversion sheet 216 and a first light conversion pattern 216p1 disposed in the outermost position of the plurality of light conversion patterns 216p. The light conversion pattern 216p can be implemented by means of printing a light conversion material on the light conversion sheet 216. The light conversion material can include titanium dioxide ($TiO_2$). Further, the light conversion material can be of white color, although not limited thereto.

Each light conversion pattern 216p can include a plurality of patterns, which are made of a given light conversion material and disposed on the same plane. That is, the light conversion pattern 216p can include a plurality of patterns formed of the light conversion material on the light conversion sheet 216. The plurality of patterns can formed of the light conversion material arranged in a radiating form. The plurality of patterns may have a ring shape, an island shape, or a circular shape and the like. The plurality of patterns may be arranged concentrically.

As illustrated in FIG. 4, each light conversion pattern 216p can include a plurality of layers. A respective light conversion pattern 216p can be arranged in such a manner that two layers of the light conversion material are disposed at the center of the pattern, thereby forming an island shaped pattern, and one layer of the light conversion material is respectively disposed outside the two layers disposed at the center area, thereby forming a ring-shaped pattern. Although FIG. 4 illustrates that a cross-section of one light conversion pattern consists of two layers having the light conversion material disposed in its center area, and two other layers each having the light conversion material respectively disposed spaced apart from either one side end of the two center layers, it is to be noted that this is merely a simple illustration of a preferred embodiment of the light conversion pattern 216p and the light conversion materials in the light conversion pattern 216p can be arranged in a radiating form, as shown in FIG. 3 above.

Further, the thickness of the phosphor layer 216a disposed on the light conversion sheet 216 can be corresponding to that of one layer of the light conversion pattern 216p, although not limited thereto. Further, the widths Wa and Wb of the phosphor layer 216a disposed on the light conversion sheet 216 can correspond to the shape of the first light conversion pattern 216p1.

The light conversion pattern 216p can be disposed to overlap the light emitting device 201, and the light emitted from the light emitting device 201 is caused to radiate in a radiating form. Therefore, the light traveling in the second path PS2 can be irradiated only to the rim portion of the light conversion sheet 216 that does not overlap the light conversion pattern 216p. Thus, the phosphor layer 216a can be disposed in the rim portion of the light conversion sheet 216 so as to cause excitation of the light traveling through the second path PS2, and can be disposed on an area where the light conversion patterns 216p are not arranged, corresponding to the shape of the light conversion pattern 216p. By making the width of the phosphor layer 216a disposed on the light conversion sheet 216 correspond to the shape of the light conversion pattern 216p, in particular, e.g., the shape of the first light conversion pattern 216p1, it will be possible to greatly reduce the use of the phosphor material, thereby correspondingly reducing the manufacturing costs of the backlight unit according to the embodiments of the present disclosure.

The light conversion sheet 216 can further include an adhesive film 215, and the light conversion sheet 216 can be bonded to the resin layer 205 by the adhesive film 215. Further, the height of the adhesive film 215 can be higher than the highest height of the light conversion pattern 216p. Furthermore, the height of the adhesive film 215 can be higher than the height of the central portion of the light conversion pattern 216p. Further, when the light conversion sheet 216 is made to bond to an upper surface of the resin layer 205 by means of the adhesive film 215, the height of the adhesive film 215 is adapted to be higher than the highest height of the light conversion pattern 216p, so that the lower surface of the light conversion pattern 216p and the resin layer 205 can be disposed spaced apart from each other by a predetermined interval. However, the height of the adhesive film 215 is not limited to the aforementioned.

When the light conversion pattern 216p is of one layer, the reflectivity can be preferably in a range of 60 to 70% and the absorptivity/transmissivity can be preferably in a range of 30 to 40%. In addition, when the light conversion pattern 216p is of two layers, the reflectivity can be preferably in a range of 70 to 80% and the absorptivity/transmissivity can be preferably in a range of to 30%. However, the reflectivity of the light conversion pattern 216p is not limited to the aforementioned, and it can vary depending on the content of titanium dioxide $TiO_2$ included in the light conversion pattern 216p and the thickness of the layer of the light conversion pattern 216p. As the content of titanium dioxide $TiO_2$ or the thickness of the layer of the light conversion pattern 216p gets thicker, the reflectivity of the light conversion pattern 216p will increase while the transmissivity will decrease.

Figure 6:
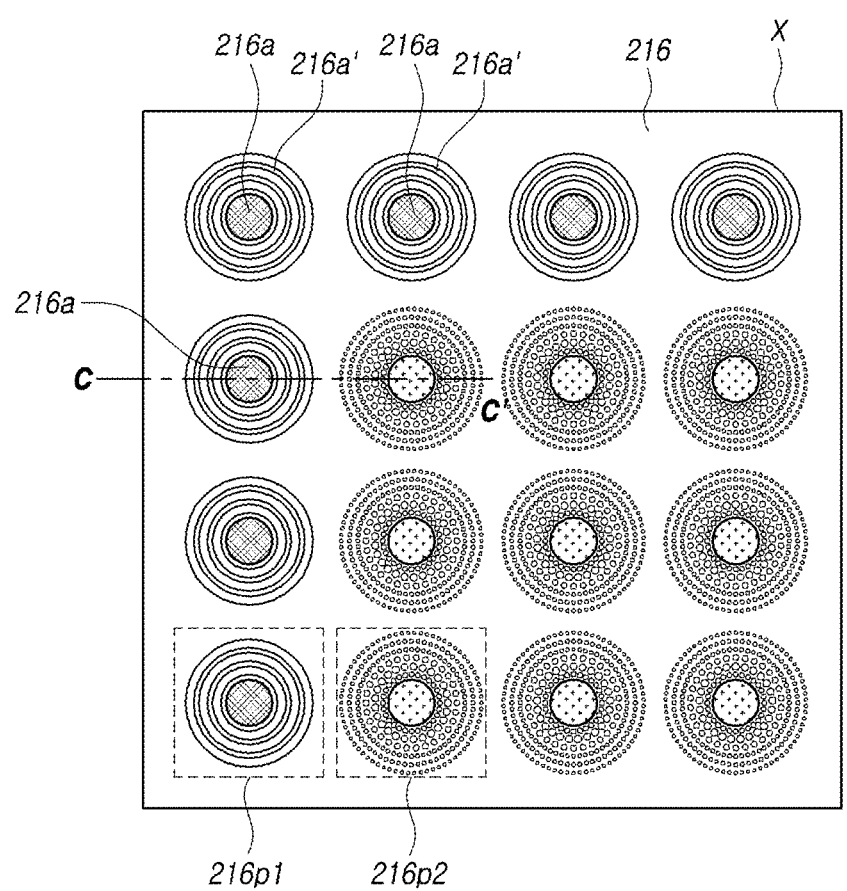
FIG. 6 is a plan view showing a light conversion sheet disposed in a portion X of FIG. 2 in one or more embodiments of the present disclosure.
Figure 7:
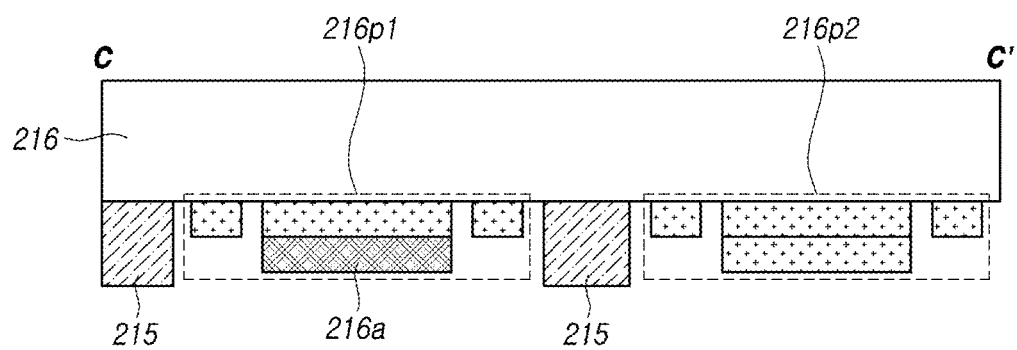
FIG. 7 is a cross-sectional view showing a cross-section along a line C-C' in FIG. 6.

FIG. 6 shows a plan view of the light conversion sheet disposed in a portion X of FIG. 2 in one or more embodiments of the present disclosure, and FIG. 7 shows a cross-sectional view showing a cross-section along a line C-C' in FIG. 6.

Referring now to FIGS. 6 and 7, the light conversion sheet 216 can include a plurality of light conversion patterns 216p and a least one phosphor layer 216a. The plurality of light conversion patterns 216p can be sorted into first light conversion patterns 216p1 disposed on the outermost side and second light conversion patterns 216p2 except for the first light conversion patterns 216p1. The phosphor layer 216a can be disposed in a position corresponding to the first light conversion pattern 216p1 among the plurality of light conversion patterns 216p. Further, the phosphor layer 216a can be disposed at the center portion of the first light conversion pattern 216p1.

Each light conversion pattern 216p can include a plurality of patterns, which are made of a light conversion material and disposed on the same plane. The plurality of patterns may be arranged directly on the light conversion sheet 216. That is, the light conversion pattern 216p can be arranged to be provided with patterns made of the light conversion material on the light conversion sheet 216. Further, the first light conversion pattern 216p1 among the plurality of light conversion patterns 216p can have at least one phosphor layer 216a disposed on at least some of the plurality of patterns. The light conversion material can include, preferably, titanium dioxide ($TiO_2$), for example. In addition, the light conversion material can be of white color, although it is not limited thereto.

As shown in FIG. 7, the plurality of light conversion patterns can respectively include a plurality of layers, wherein a first layer of the first light conversion pattern 216p1 among the plurality of light conversion patterns can include a light conversion material, and a second layer thereof can include a phosphor layer 216a. Further, the first light conversion pattern 216p1 can be arranged to include one layer of the light conversion material and another layer of the phosphor layer 216a, in its center region. Further, one additional layer inclusive of the light conversion material can be disposed along the outermost side ends of the two inner layers disposed in the center region. However, the present disclosure is not limited to the aforementioned arrangement of layers, and the outer layer can also include such a phosphor layer 216a.

Referring then to the cross-sections of the first and second light conversion patterns 216p1 and 216p2 as shown in FIG. 7, the center region of the first light conversion pattern 216p1 can include a phosphor layer 216a. Further, the center portion of the first light conversion pattern 216p1 can have one layer including the light conversion material and another layer including a phosphor layer 216a, stacked on the light conversion sheet 216. Further, in the center region of the second light conversion pattern 216p2, two layers each including the light conversion material can be stacked on the light conversion sheet 216. The second light conversion pattern 216p2 can be arranged so that one layer including the light conversion material can be disposed in its center region, although the shapes of the light conversion patterns 216p1 and 216p2 are not limited to the aforementioned arrangement.

The first light conversion pattern 216p1 can include a ring-shaped or circular band-shaped pattern 216a' surrounding the center of the first light conversion pattern 216p1, as shown in FIG. 6. The circular band-shaped pattern 216a' can include the light conversion material, although not limited thereto, and the circular band-shaped pattern 216a' can include the phosphor layer. Furthermore, the second light conversion pattern 216p2 can have, for example, a pattern formed in such a manner that the light conversion materials are arranged in a radiating form from the center or have a circular shape, as illustrated in FIG. 6.

The light conversion sheet 216 can further include an adhesive film 215, and the light conversion sheet 216 can be bonded onto the resin layer 205 by means of the adhesive film 215. The light conversion pattern 216p can be implemented by printing a light conversion material on the light conversion sheet 216.

Further, the height of the adhesive film 215 can be higher than the height of the light conversion pattern 216p. The height of the adhesive film 215 can be higher than the height of the center portion of the light conversion pattern 216p. When the light conversion sheet 216 is bonded onto the upper portion of the resin layer 205 by means of the adhesive film 215, the lower surface of the light conversion pattern 216p and the resin layer 205 can be spaced apart from each other by a predetermined gap, although it is not limited thereto.

In FIGS. 3 to 5, it is shown that the phosphor layer 216a disposed on the light conversion sheet 216 can be disposed between one end of the light conversion sheet 216 and the first light conversion pattern 216p1 disposed in the outermost one of the plurality of light conversion patterns 216p, or in FIGS. 6 and 7, it is shown that the phosphor layers 216pa disposed on the light conversion sheets 216 can be disposed only in the first light conversion patterns 216p1, but the arrangement of the phosphor layer 216a is not limited thereto.

In other words, it is noted that the phosphor layer 216a disposed on the light conversion sheet 216 can be arranged between one side end of the light conversion sheet 216 and the first light conversion pattern 216p1 disposed in the outermost one of the plurality of light conversion patterns 216p, and/or in the first light conversion pattern 216p1 as well. Further, referring then to FIG. 3 or 6, it is also seen that the phosphor layer 216a can be disposed on the first light conversion pattern 216p1 disposed on the outermost part of the light conversion sheet 216, as well as other light conversion patterns positioned adjacent to the first light conversion pattern 216p1 among the second light conversion patterns 216p2.

In addition to the above, referring again to FIG. 3 or 6, the phosphor layer 216a disposed on the light conversion sheet 216 can be arranged in an area between the first light conversion pattern 216p1 disposed on the outermost part of the light conversion sheet 216, and the second light conversion pattern 216p2.

Hence, the phosphor layer 216a can be not disposed in a uniform width over the entire rim of the light emitting unit 250, and thus, it can be disposed with different widths Wa and Wb and only in a specific area, according to the shape of the light conversion patterns. Therefore, it is possible to reduce the production costs according to the embodiments of the present disclosure, by reducing the use of the phosphor material included in the phosphor layer 216a.

Figure 8:
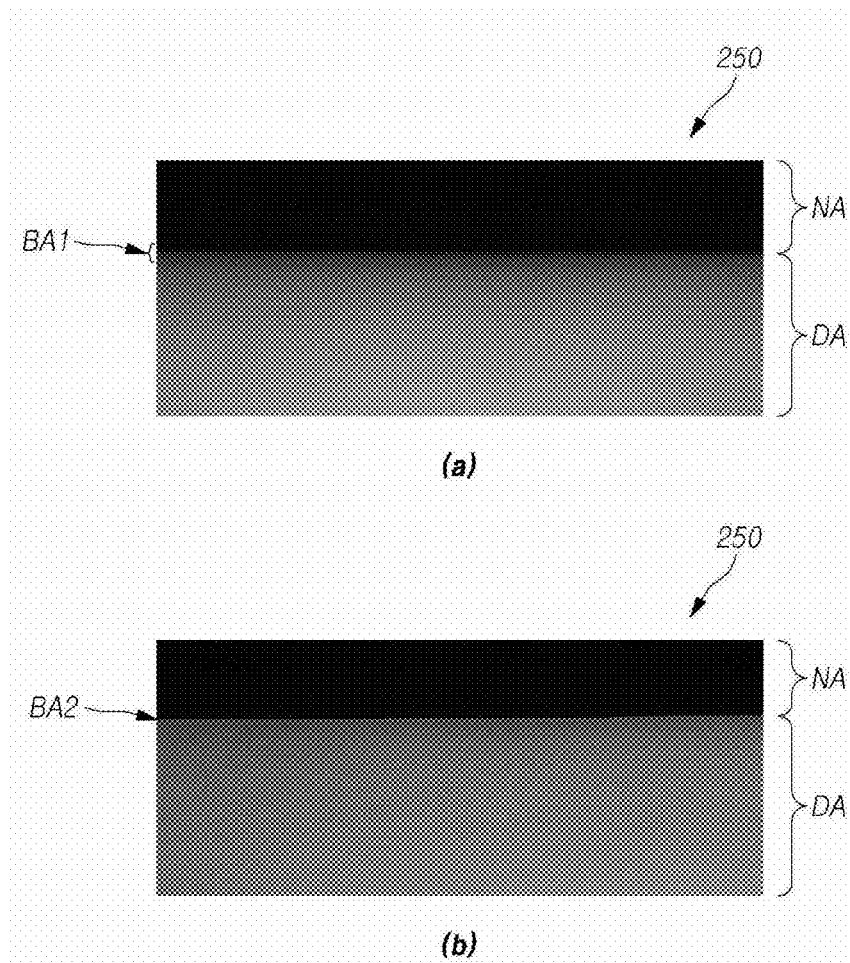
FIG. 8 shows views for comparing the luminance displayed in the backlight units in a case where no phosphor layer is disposed and another case where a phosphor layer is disposed in embodiments of the present disclosure.

FIG. 8 shows comparative views comparing the luminance displayed in the backlight units in a first case (a) where no phosphor layer is disposed and in a second case (b) where a phosphor layer is disposed, in embodiments of the present disclosure. Since the light emitted from the backlight unit 200 before passing through the display panel 100 has a higher color temperature than normal white light, the white light passing through the light conversion sheet 216 and the phosphor film 218 according to the disclosed embodiments can be recognized as a bluish color.

Referring then to FIG. 8, the backlight unit 200 can be divided into a non-display portion NA covered by the guide panel 400 and a display portion DA not covered by the guide panel 400. Borders (or boundaries) BA1 and BA2 can appear in between the non-display area NA and the display area DA due to differences in blue light components.

In FIG. 8, the view (a) represents a case including no phosphor layer 216a as shown in FIG. 2 in the backlight unit 200, wherein it is seen that a thin band is displayed as mura near the boundary BA1 in the display portion DA.

On the other hand, another view (b) of FIG. 8 represents a case including the fluorescent layer 216a as shown in FIG. 2 in the backlight unit 200, wherein it is seen that such a band is not displayed in between the non-display portion NA and the display portion DA, so that the boundary BA2 can be clearly displayed.

As shown in the view (a) of FIG. 8 above, when such a band appears on the display portion DA in the backlight unit 200, the uniformity of luminance of the backlight unit 200 significantly deteriorate and thus, the boundary BA1 can be displayed thicker due to the band. Therefore, the entire boundary BA1 displayed thick needs to be covered up. For this reason, therefore, it will be very difficult for a designer to implement a narrow bezel.

On the other hand, as shown in the view (b) of FIG. 8 above, when the boundary BA2 gets to be more clearly displayed, that is, no band appears on the display portion DA, the boundary BA2 can be displayed in much less width. Thus, as the boundary BA2 is allowed to be displayed more thinly, the portion to be covered up in the backlight unit 200 can be implemented in a much less width. Hence, it makes it easier for the designer to implement a narrow bezel design.

Figure 9:
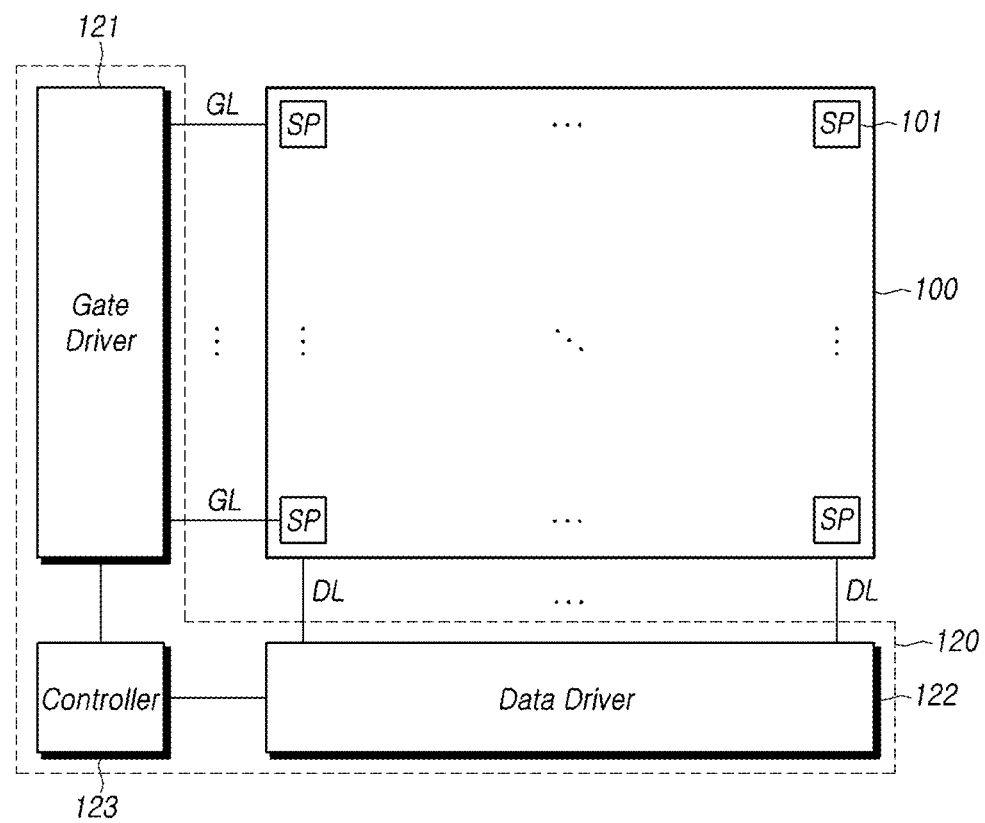
FIG. 9 is a structural diagram showing a display panel and a driving circuit for driving the display panel according to embodiments of the present disclosure.

FIG. 9 shows a structural diagram of a display panel and a driving circuit for driving the display panel according to embodiments of the present disclosure.

Referring then to FIG. 9, the display panel 100 is configured to display images, and the driving circuit 120 for driving the display panel 100 is configured to transmit one or more signals and/or voltages to the display panel 100 to have the images displayed thereon. The driving circuit 120 can further include a gate driver 121, a data driver 122 and a controller 123.

The display panel 100 can include a plurality of gate lines GL and a plurality of data lines DL. The display panel 100 can include at least one subpixel 101 connected to the gate line GL and the data line DL. Further, the display panel 100 can be a liquid crystal panel, which can include a pixel electrode, a common electrode, and a liquid crystal layer disposed between the pixel electrode and the common electrode. The liquid crystal layer is configured to display the images, by causing its molecular arrangement to change in response to voltages applied to the pixel electrode and the common electrode, so as to block or transmit the light through the layer.

The gate driver 121, controlled by the controller 123, can make a control of the driving timing of the plurality of subpixels 101 by sequentially outputting scan signals via the plurality of gate lines GL arranged on the display panel 100. The gate driver 121 can include at least one gate driver integrated circuit (GDIC), and can be disposed on either one side or both sides of the display panel 100 according to a driving scheme in use.

Each gate driver integrated circuit (GDIC) can be connected to a bonding pad of the display panel 100 by means of tape-automated bonding (TAB) or chip-on-glass (COG)

method, or can be implemented in a gate-in-panel (GIP) type to be directly disposed on the display panel 100. In addition, each gate driver integrated circuit (GDIC) can be implemented with a chip-on-film (COF) method, being capable of being mounted on a film connected to the display panel 110.

The data driver 122 is configured to receive image data from the controller 123 to convert the received image data into a series of analog data voltage. The data driver 122 is configured to output a data voltage to each data line DL in line with the timing at which the scan signal is applied through the gate line GL, so that each sub-pixel 101 can represent brightness according to the image data.

The data driver 122 can include at least one source driver integrated circuit (SDIC), and each source driver integrated circuit (SDIC) can include a shift register, a latch circuit, a digital-to-analog converter, and an output buffer, although not limited thereto.

Each source driver integrated circuit (SDIC) can be connected to the bonding pad of the display panel 100 by means of the tape automated bonding (TAB) or the chip-on-glass (COG) method, or can be directly disposed on the display panel 100. Further, each source driver integrated circuit (SDIC) can be implemented with the chip-on-film (COF) method, in which each source driver integrated circuit (SDIC) can be mounted on a film connected to the display panel 100 and be electrically connected to the display panel 100 through wirings on the film.

The controller 123 can be configured to supply various control signals to the gate driver 121 and the data driver 122, so as to control the operation of the gate driver 121 and the data driver 122. The controller 123 can be mounted on a printed circuit board, and can be electrically connected to the gate driver 121 and the data driver 122 through the printed circuit board. The controller 123 can be also configured to control the gate driver 121 to adaptively output the scan signal according to the operational timing to be implemented in each frame.

Further, the controller 123 can be configured to convert externally received image data in compliance with a data signal format used by the data driver 122 and then output the converted image data to the data driver 122. The controller 123 can be configured to receive from an external source (e.g., a host system) various timing signals including e.g., a vertical sync signal VSYNC, a horizontal sync signal HSYNC, an input data enable signal DE, and a clock signal CLK, together with image data.

Then, the controller 123 can be configured to generate various control signals using the various timing signals transmitted from the outside to output the same to the gate driver 121 and the data driver 122. For example, in order to control the gate driver 121, the controller 123 can be configured to provide a variety of gate control signals GCS inclusive of e.g., a gate start pulse GSP, a gate shift clock GSC, a gate output enable signal GOE, and so on. Here, the gate start pulse GSP can be configured to control the operation start timing of at least one gate driver integrated circuit (GDIC) constituting the gate driver 121.

The gate shift clock GSC can be a clock signal commonly input to at least one gate driver integrated circuit (GDIC), for controlling the shift timing of the scan signal. The gate output enable signal GOE can specify the timing information of the at least one gate driver integrated circuit (GDIC).

Furthermore, in order to control the data driver 122, the controller 123 can be configured to output various data control signals DCS inclusive of, e.g., a source start pulse SSP, a source sampling clock SSC, a source output enable signal SOE, and so on. Here, the source start pulse SSP can be adapted to control the data sampling start timing of one least one source driver integrated circuit (SDIC) constituting the data driver 122. The source sampling clock SSC can be a clock signal to control the data sampling timing in each of the source driver integrated circuits (SDIC). Further, the source output enable signal SOE can be adapted to control the output timing of the data driver 122.

In addition, the driving circuit 120 can include a power management integrated circuit for supplying various voltages and/or currents to the display panel 100, the gate driver 121, the data driver 122, the controller 123 and others, or controlling those various voltages or currents to be supplied thereto.

FIGS. 10A to 10E are process diagrams illustrating a detailed structure of a backlight unit according to embodiments of the present disclosure. FIGS. 10A to 10E show a process for manufacturing the backlight unit according to embodiments of the present disclosure.

Figure 10A:
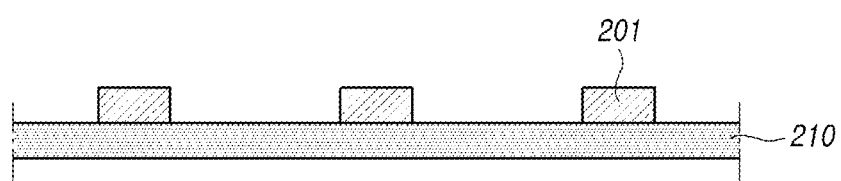
FIGS. 10A to 10E are process diagrams illustrating a detailed structure of a backlight unit according to embodiments of the present disclosure.

Referring first to FIG. 10A, a plurality of light emitting devices 201 can be disposed on the substrate 210. A coated reflective film can be disposed on the substrate 210, and the coated reflective film can be of a white pigment. That is, a white pigment can be applied onto the substrate 210.

Figure 10B:
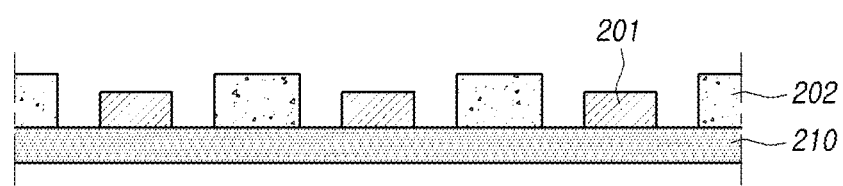

Referring then to FIG. 10B, at least one reflector 202 can be disposed on at least part of an area other than the area in which the light emitting devices 201 are disposed on the substrate 210.

This reflector 202 can be manufactured in a shape in which an area corresponding to the light emitting device 201 is opened and then disposed to be seated on the substrate 210. Further, the reflector 202 can cause reflection of the light emitted from the light emitting device 201 off the front surface of the backlight unit 200, thereby increasing the light efficiency of the backlight unit 200.

Here, when the light emitting device 201 is disposed in the form of a chip, the size of the light emitting device 201 becomes relatively smaller, so the height of the reflector 202 can be higher than that of the light emitting device 201.

Therefore, the light emitted from a side surface of the light emitting device 201 can be reflected off a side surface of the reflector 202 to be irradiated onto an entire surface of the backlight unit 200, thereby further enhancing the light efficiency of the backlight unit 200.

Figure 10C:
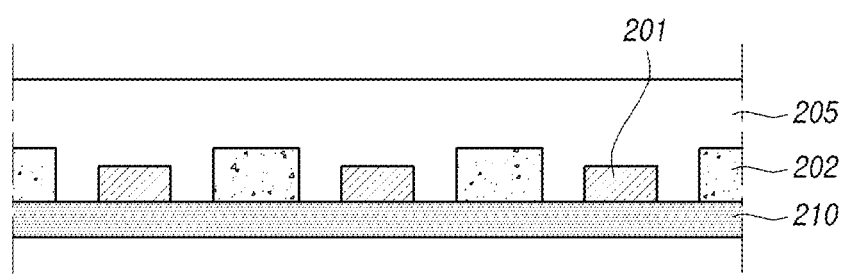

Referring then to FIG. 10C, a resin layer 205 can be disposed on the plurality of light emitting devices 201 and the reflectors 202, wherein the resin layer 205 can include resin. When depositing the resin layer 205, a partition wall can be disposed in the outer part of the substrate 210 or an outermost portion of the area where the plurality of light emitting devices 201 are disposed on the substrate 210, and the resin can be then coated on the inner side of the partition wall, so as to make the resin layer 205 disposed over the plurality of light emitting devices 201 and the reflectors 202.

The resin layer 205 can serve to protect the plurality of light emitting devices 201 disposed on the substrate 210, and can provide a function as a light guide plate by causing diffusion of the light emitted from the light emitting devices 201. Thus, the light emitted from the light emitting device 201 can be spread over the upper surface of the resin layer 205 as most evenly as possible. At this point, even though an adjustment can be made to the direction in which the light spreads throughout the resin layer 205 by the reflector 202, the intensity of the light transmitted from the resin layer 205 through an area corresponding to the vertical direction of the light emitting device 201 can be larger than that of the light transmitted out through any other areas. Therefore, it will inevitably result in considerable deterioration of luminance uniformity in the light emitted from the backlight unit 200.

According to the embodiments of the present disclosure, it is possible to improve the luminance uniformity of displayed images while reducing the thickness of the backlight unit 200, by allowing the light conversion sheet 216 with the optical characteristics to be disposed in the position corresponding to the light emitting device 201 on the resin layer 205.

Figure 10D:
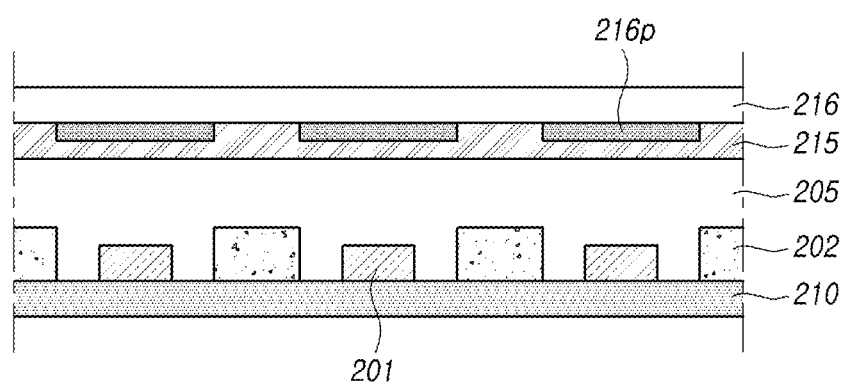

Referring now to FIG. 10D, it is seen that the light conversion sheet 216 can be disposed above the resin layer 205, and the light conversion sheet 216 can include a plurality of light conversion patterns 216p disposed on its bottom surface, although these light conversion patterns 216p can be disposed on an uppermost surface of the light conversion sheet 216 as circumstances arise. Then, the light conversion sheet 216 can be bonded to the resin layer 205 by means of an adhesive film 215. The adhesive film 215 can be an optical clear adhesive (OCA) film. Further, the light conversion sheet 216 can be formed of, e.g., PET or the like, although not limited thereto.

Each of the plurality of light conversion patterns 216p disposed on the bottom surface of the light conversion sheet 216 can be arranged in a position corresponding to each of the plurality of light emitting devices 201 disposed on the substrate 210. For example, at least a portion of the light conversion pattern 216p can be disposed to overlap the light emitting device 201. As such, when considering the diffusion characteristics of light, the light conversion pattern 216p can be disposed to overlap an area including the area where the light emitting device 201 is disposed. The light conversion pattern 216p allows the light emitted from the light emitting device 201 to undergo scattering, reflection, diffraction and/or transmission. For example, the light conversion pattern 216p can cause scattering of the light emitted from the light emitting device 201, thereby enabling to direct the light both in the vertical direction and in the oblique direction. Further, causing to undergo reflection of the light emitted from the light emitting device 201 and then, causing again to undergo reflection by the reflector 202, makes it possible the light to be output through an area between the light emitting devices 201.

As described above, the light emitted from the light emitting device 201 is adapted to undergo scattering, reflection, diffraction and/or transmission by the light conversion pattern 216p, so that the luminance uniformity of the backlight unit 200 can be significantly enhanced.

Figure 10E:
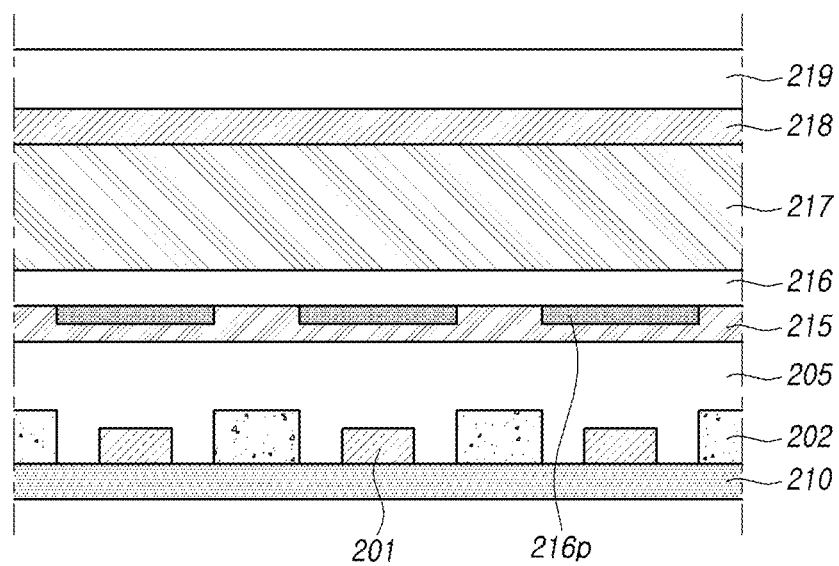

Referring then to FIG. 10E, the diffuser plate 217 can be disposed on the light conversion sheet 216, and the phosphor film 218 can be disposed on the diffuser plate 217. Further, at least one optical sheet 219 can be disposed on the phosphor film 218. Here, the diffuser plate 217 and the phosphor film 218 can be positioned interchangeably with each other.

The diffuser plate 217 can cause diffusion of the light emitted out through the light conversion sheet 216. The phosphor film 218 can include a phosphor material with a specific color, and cause excitation of the incident light to emit a specific wavelength band of light. For this reason, the light passing through the phosphor film 218 can be of a specific color included in the phosphor film 218 or a color mixed with the specific color. As an example, when the light emitting device 201 emits blue light, the phosphor film 218 can react to the incident light to generate therefrom green light and/or red light.

Further, the phosphor film 218 can be disposed in some area on the diffuser plate 217 as circumstances require. For example, when the light emitting device 201 is adapted to give off the blue light, the phosphor film 218 can be disposed only in some area except for a surface area corresponding to the area in which the blue subpixel 101 is disposed in the liquid crystal panel 100. That is, an arrangement can be made so that the light that has not passed through the phosphor film 218 reaches the blue sub-pixel 101 of the display panel 100.

As described heretofore, the backlight unit 200 is configured to include the light conversion sheet 216 with the light conversion patterns 216p disposed in the position corresponding to the light emitting device 201, and other various optical elements, thereby making it possible to improve the luminance uniformity of the light presented by the backlight unit 200 while implementing a reduced thickness of the backlight unit 200.

In the following, the embodiments of the present disclosure will be further described together with a specific example of the light conversion patterns 216p disposed on the light conversion sheet 216.

Figure 11:
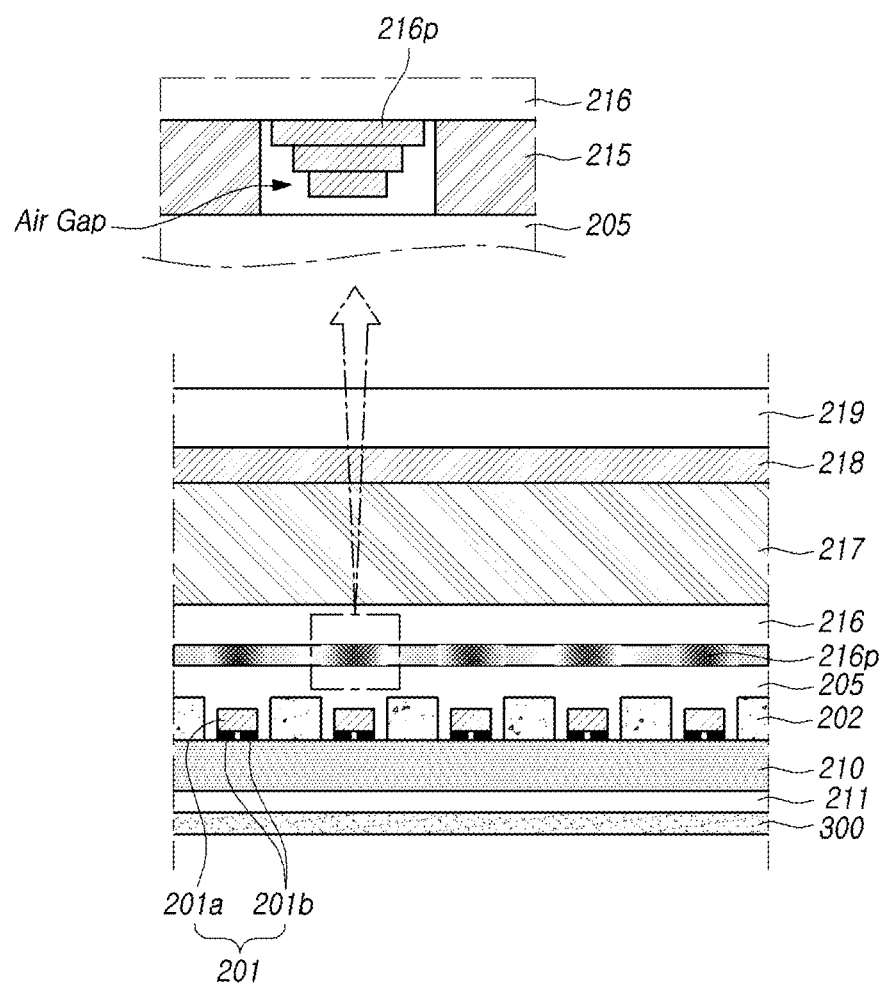
FIG. 11 is a schematic diagram showing the structure of a backlight unit according to embodiments of the present disclosure.

FIG. 11 is a schematic diagram showing the structure of the backlight unit according to the embodiments of the present disclosure.

Referring now to FIG. 11, the substrate 210 can be disposed on a cover bottom 300. The cover bottom 300 can be fixed onto the substrate 210 by means of an adhesive tape 211 disposed between the substrate 210 and the cover bottom 300. However, it is to be noted that the arrangement of the cover bottom 300 is not limited thereto, and it can be fixed to the substrate 210 by means of screws.

A plurality of light emitting devices 201 can be disposed on the substrate 210, and at least one reflector 202 can be disposed in at least some of an area other than the area in which the light emitting devices 201 are disposed.

Here, the light emitting device 201 can include, for example, a light emitting diode (LED), which can further include a light emitting section 201a having an n-type semiconductor layer, an activation layer and a p-type semiconductor layer, and an electrode section 201b. A resin layer 205 can be disposed on the plurality of light emitting devices 201 and the reflectors 202. A light conversion sheet 216 can be disposed on the resin layer 205, with light conversion patterns 216p disposed in a position corresponding to each of the light emitting devices 201 on the resin layer 205. Further, on the light conversion sheet 216 can be disposed a diffuser plate 217, a phosphor film 218, and an optical sheet 220 in sequence.

The light conversion pattern 216p disposed on the bottom surface of the light conversion sheet 216 can be implemented by making it printed with specific ink having light conversion characteristics on the light conversion sheet 216, preferably, for example, coating the light conversion pattern 216p using a method of printing a certain pattern with ink inclusive of $TiO_2$ on the light conversion sheet 216. Further, the light conversion pattern 216p disposed on the bottom surface of the light conversion sheet 216 can be formed either in one layer or in a multi-layer structure. As shown in FIG. 11, the light conversion pattern 216p disposed on the bottom surface of the light conversion sheet 216 can be formed of, for instance, three layers, although it is not limited thereto. Then, the light conversion pattern 216p can be efficiently implemented using the method of printing the light conversion material at least three times on the light conversion sheet 216.

Meanwhile, since the intensity of light emitted from the light emitting device 201 has the largest in its vertical direction, the central portion of the light conversion pattern 216p can be formed with thicker depth than any other peripheral portion thereof. That is to say, the area of the printed light conversion material can be formed to have less area (i.e., narrower) as it goes further to a next printing sequence, although not limited thereto. Thus, the area of the light conversion pattern 216p can be formed narrower as it goes further downwards from the light conversion sheet 216, and thus, the thickness in the central portion of the light conversion pattern 216p can be greater than that in its outer portion. Further, the light conversion sheet 216 provided with the light conversion patterns 216p can be disposed in such a manner that the light conversion patterns 216p are adjacent to the resin layer 205.

With the light conversion pattern 216p disposed over the light emitting device 201, it makes it possible to block the light output in a vertical direction from the light emitting device 201, thereby preventing formation of a hot spot in an area in which the light emitting devices 201 of the backlight unit 200 are disposed. The light conversion sheet 216 provided thereon with the light conversion pattern 216p can be bonded to the resin layer 205 by means of an adhesive film 215. Here, the adhesive film 215 can be disposed on at least some of an area other than the area where the light conversion pattern 216p is disposed, on the bottom surface of the light conversion sheet 216.

Then, the adhesive film 215 may not be disposed in the area where the light conversion pattern 216p is disposed, and an air gap can exist in between the light conversion pattern 216p and the resin layer 205. Further, the sides of the light conversion patterns 216p can be respectively arranged to be spaced apart from the adhesive film 215. As the air gap exists between the light conversion pattern 216p and the resin layer 205, the light emitted in the lateral direction of the light conversion pattern 216p can be reflected by the air gap. That is to say, the light output in the lateral direction of the light conversion pattern 216p can be output at a large refractive angle by the air gap having a low refractive index or be reflected off the air gap. Then, the light reflected off the air gap is allowed to be reflected again by the reflector 202 and then output therefrom, thereby further increasing the light efficiency of the backlight unit 200, while assisting the light conversion function of the light conversion pattern 216p.

As described above, it is possible to increase the light efficiency of the backlight unit while preventing formation of the hot spots, owing to the structure of arranging the light conversion pattern 216p and the air gap in the position corresponding to the light emitting device 201. Meanwhile, the light conversion patterns 216p disposed underneath the light conversion sheet 216 can be arranged in a different structure according to their positions.

Figure 12A:
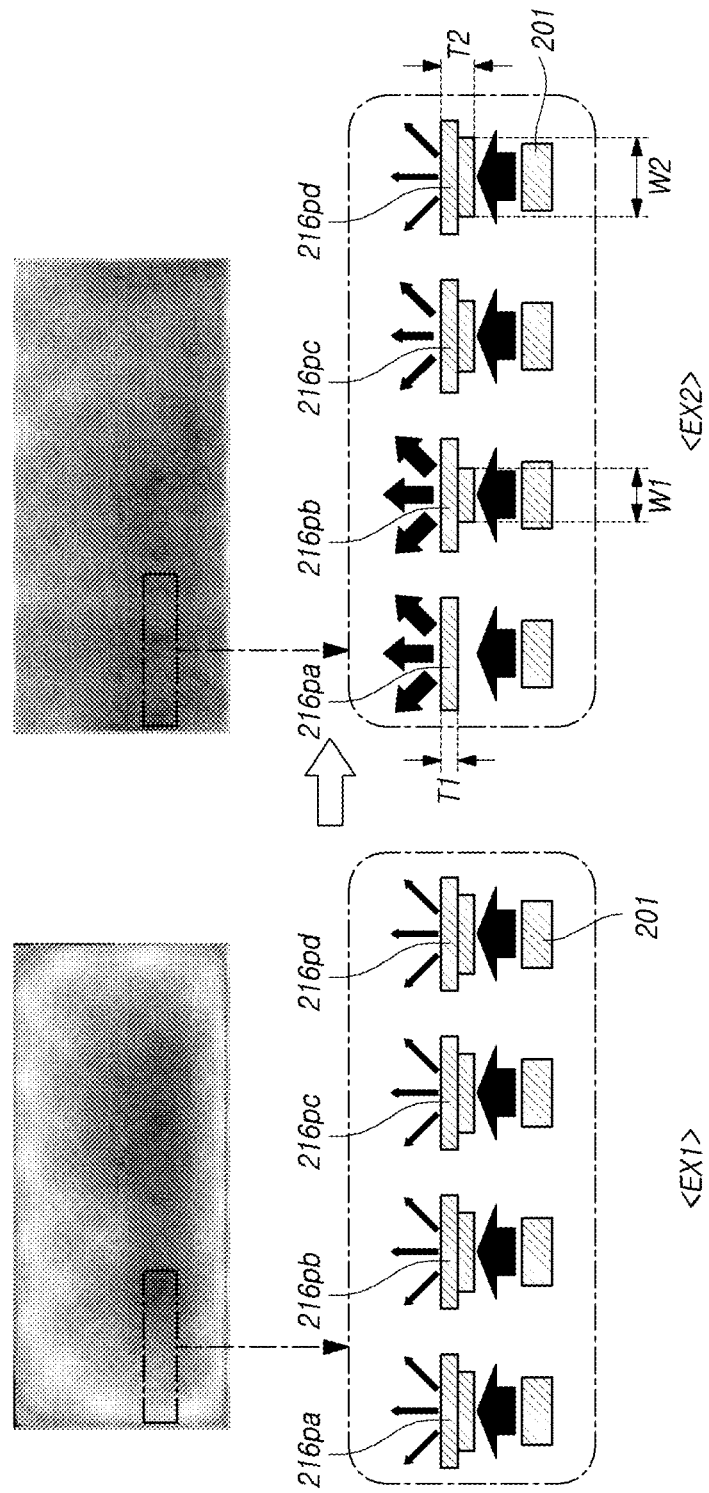
FIGS. 12A and 12B are schematic diagrams illustrating an example of the structures according to the disposed position of a light conversion pattern included in the backlight unit shown in FIG. 11.
Figure 12B:
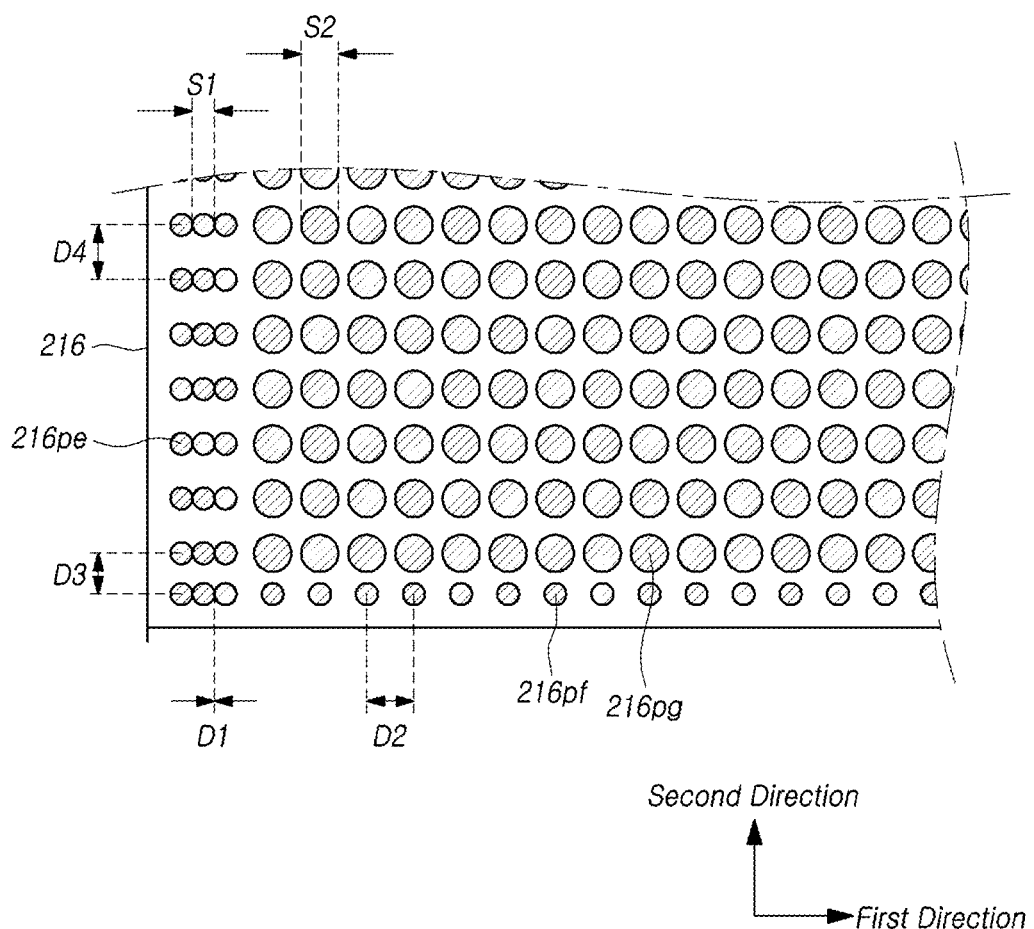

FIGS. 12A and 12B each illustrate an example of the structure according to the arrangement positions of the light conversion patterns included in the backlight unit as illustrated in FIG. 11.

Referring now to FIG. 12A, illustrating examples of the luminance presented in the backlight unit 200 according to the structure of the light conversion pattern 216p, it is seen that the example <EX1> represents the luminance measured when the light conversion pattern 216ps are arranged in a regular pattern of structure, whereas the example <EX2> represents the luminance measured when the light conversion patterns 216p are arranged in a different pattern of structure according to their positions.

As seen in the example <EX1> of FIG. 12A, the luminance in the peripheral area of the backlight unit 200 can appear lower, when the light conversion pattern 216pa disposed in the peripheral area of the backlight unit 200 and the light conversion pattern 216pd disposed in its central area are substantially the same as each other in their structures.

In other words, as the number of the light emitting devices 201 supplying light to the peripheral area of the backlight unit 200 is relatively smaller, the luminance in the peripheral area of the backlight unit 200 can get lower than that of the central area of the backlight unit 200 in case where the light conversion patterns 216p having the same level of light conversion characteristics are arranged thereon.

Therefore, as seen in the example <EX2> of FIG. 12A, by having the light conversion pattern 216pa in the peripheral area of the backlight unit 200 arranged in a different structure from the light conversion pattern 216pd in the central area thereof, it is possible to prevent the luminance in the peripheral area of the backlight unit 200 from deteriorating and thus, make its overall luminance uniform.

As an example, the light conversion patterns 216p can be arranged so that the thickness T1 of the light conversion pattern 216pa disposed in the peripheral area of the backlight unit 200 is smaller than the thickness T2 of the light conversion pattern 216pd disposed in its central area.

Alternatively, the light conversion patterns 216p can be arranged so that the area W1 of the thickest portion in the light conversion pattern 216pb disposed adjacent to the peripheral area of the backlight unit 200 is smaller than the area W2 of the thickest portion in the light conversion pattern 216pd. In other words, the light conversion patterns 216p can be arranged so that the portion having higher blocking characteristics in the light conversion patterns 216pa and 216pb disposed in the peripheral area of the backlight unit 200 or an area adjacent to the peripheral area has a smaller area.

Further, the light conversion patterns 216p can be arranged so that as it goes further from the center area to the peripheral area of the backlight unit 200, the thickness of the light conversion pattern 216p or the area of the thickest portion in the light conversion pattern 216p gradually decreases.

Furthermore, the arrangement can be made so that the distance between light emitting devices 201 or the number of the light emitting devices 201 in the central area and the peripheral area of the backlight unit 200 can be different from each other as circumstances require, and thus, the light conversion patterns 216p can be arranged in a different pattern from each other.

Referring then to FIG. 12B, it is shown another example of the structure in which the light conversion patterns 216p are disposed on a bottom surface of the light conversion sheet 216.

Here, the distance between the light emitting devices 201 disposed in the peripheral area of the backlight unit 200 can be narrower than the distance between the light emitting devices 201 disposed in the central area of the backlight unit 200. That is to say, the light emitting devices 201 can be arranged in a more dense structure for the peripheral area of the backlight unit 200, so that the luminance in both the central area and the peripheral area of the backlight unit 200 becomes uniform.

Then, as the light conversion patterns 216p disposed on the bottom surface of the light conversion sheet 216 are arranged in the position corresponding to the light emitting device 201, the distance between the light conversion patterns 216p disposed in the peripheral area of the backlight unit 200 can be different from that between the light conversion patterns 216p disposed in the central area thereof.

As an example, the distance D1 in the first direction of the light conversion patterns 216p disposed in the peripheral area of the backlight unit 200 can be smaller than the distance D2 in the first direction of the light conversion patterns 216p disposed in the central area thereof. Further, the distance D3 in the second direction of the light conversion patterns 216p disposed in the peripheral area of the backlight unit 200 can be smaller than the distance D4 in the second direction of the light conversion patterns 216p disposed in the central area thereof.

Here, the size and the thickness of the light conversion patterns 216p disposed in the peripheral area of the backlight unit 200 can be different from those of the light conversion pattern 216p disposed in the central area of the backlight unit 200.

For example, as illustrated in FIG. 12B, the size S1 of the light conversion patterns 216pe and 216pf disposed in the peripheral area of the backlight unit 200 can be smaller than the size S2 of the light conversion pattern 216pg disposed in the central area of the backlight unit.

Furthermore, the light conversion patterns 216p can have a multi-layer structure as described above, wherein the thickness of the light conversion patterns 216pe and 216pf disposed in the peripheral area of the backlight unit 200 or the area of its thickest section can be smaller than the thickness of the light conversion pattern 216pg disposed in the central area of the backlight unit 200 or the area of its thickest section.

In other words, it is possible to arrange the light conversion patterns 216pe and 216pf in line with the light emitting devices 201 disposed in a narrow spacing, by making smaller the size or diameter of the light conversion patterns 216pe and 216pf disposed in the peripheral area of the backlight unit 200. Therefore, it makes it possible to prevent formation of a hot spot at the position corresponding to the light emitting devices 201 in the peripheral area of the backlight unit 200.

Moreover, the light conversion pattern 216p makes it possible to reduce a blocked level of the light emitted from the light emitting device 201 in the peripheral area of the backlight unit 200, thereby increasing the amount of light emission and preventing the luminance in the peripheral area of the backlight unit 200 from deteriorating, thus enabling presentation of more uniform luminance over an entire area of the backlight unit 200.

As described above, it is possible to prevent the luminance from deteriorating in the peripheral area of the backlight unit 200 so as to greatly improve the luminance uniformity, owing to arranging the structure of the light conversion pattern 216p in a different pattern for each corresponding area of the backlight unit 200.

Furthermore, it is possible to prevent occurrence of hot spots in the backlight unit 200 and improve its luminance uniformity, using the particular arrangement structure of the light conversion patterns 216p as described above.

As a result, according to the embodiments of the present disclosure, it is possible to improve the luminance uniformity in the backlight unit 200 and thus provide a solution to enhance the light efficiency, by causing the light output upwardly in the vertical direction of the light emitting device 201 to undergo diffraction through the light conversion patterns 216p.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A backlight unit comprising:
    a light emitting unit including a plurality of light emitting devices;
    a light conversion sheet disposed on the light emitting unit and including a plurality of light conversion patterns overlapping with the plurality of light emitting devices;
    a phosphor film disposed on the light conversion sheet; and
    a phosphor layer directly disposed on the light conversion sheet and in a position corresponding to a rim portion of the light conversion sheet.

2. The backlight unit according to claim 1, wherein the phosphor layer is disposed between one end of the light conversion sheet and a first light conversion pattern of the plurality of light conversion patterns disposed on an outermost area of the light conversion sheet.

3. The backlight unit according to claim 1, wherein the phosphor layer is disposed on a first light conversion pattern of the plurality of light conversion patterns disposed on an outermost area of the light conversion sheet.

4. The backlight unit according to claim 1, wherein the light emitting unit further includes:
    a resin layer disposed on the substrate, to cover the plurality of light emitting devices and the at least one reflector.

5. The backlight unit according to claim 4, further comprising:
    a diffuser plate disposed on the light conversion sheet;
    the phosphor film disposed on the diffuser plate; and
    an optical sheet disposed on the phosphor film.

6. The backlight unit according to claim 4, wherein the light conversion sheet further comprises an adhesive film, by which the light conversion sheet is bonded to the resin layer.

7. The backlight unit according to claim 3; wherein each of the plurality of light conversion pattern includes a plurality of layers,
    a first layer of the first light conversion pattern includes a light conversion material, and
    a second layer thereof includes the phosphor layer.

8. The backlight unit according to claim 3, wherein each of the plurality of light conversion patterns includes a plurality of patterns, which are made of a light conversion material and disposed on the same plane, and
    in the first light conversion pattern, the phosphor layer is disposed on at least someof the plurality of patterns.

9. The backlight unit according to claim 1, wherein each of the plurality of light conversion patterns includes a light conversion material, and
    the light conversion material includes titanium dioxide ($TiO_2$).

10. The backlight unit according to claim 1, further comprising a guide panel disposed on a side of the light emitting unit.

11. The backlight unit according to claim 1, wherein the light emitting unit includes a substrate on which the plurality of light emitting devices are directly disposed and at least one reflector directly disposed on the substrate and disposed between the plurality of light emitting devices.

12. A display device comprising:
   a display panel; and
   a backlight unit configured to irradiate light onto the display panel, the backlight unit comprising:
      a light emitting unit including a plurality of light emitting devices;
      a light conversion sheet disposed over the light emitting unit and including a plurality of light conversion patterns;
      a phosphor film disposed on the light conversion sheet;
      a phosphor layer directly disposed on the light conversion sheet and in a position corresponding to a rim portion of the light conversion sheet; and
      a guide panel disposed on a side of the light emitting unit and including a protrusion protruding in the direction to the light emitting devices,
   wherein the light emitting unit includes a substrate on which the plurality of light emitting devices are directly disposed.

13. The display device according to claim 12, wherein the phosphor layer is disposed between one end of the light conversion sheet and a first light conversion pattern disposed on an outermost one of the plurality of light conversion patterns.

14. The display device according to claim 13, wherein the light conversion pattern includes a plurality of layers,
   a first layer of the first light conversion pattern includes a light conversion material, and
   a second layer thereof includes the phosphor layer.

15. The display device according to claim 12, wherein the phosphor layer is disposed on a first light conversion pattern disposed on the outermost one of the plurality of light conversion patterns.

16. The display device according to claim 12, wherein the light emitting unit further includes:
   a resin layer disposed on the substrate on which the plurality of light emitting devices and the at least one reflector are disposed.

17. The display device according to claim 16, further comprising:
   a diffuser plate disposed on the light conversion sheet;
   the phosphor film disposed on the diffuser plate; and
   an optical sheet disposed on the phosphor film.

18. The display device according to claim 16, wherein the light conversion sheet further comprises an adhesive film, by which the light conversion sheet is bonded to the resin layer.

19. The display device according to claim 15, wherein each of the plurality of light conversion patterns includes a plurality of patterns, which are made of a light conversion material and disposed on a same plane, and
   in the first light conversion pattern, the phosphor layer is disposed on at least some of the plurality of patterns.

20. The display device according to claim 12, wherein the light conversion pattern includes a light conversion material, and the light conversion material includes titanium dioxide ($TiO_2$).

* * * * *